United States Patent [19]
Barry et al.

[11] Patent Number: 5,607,345
[45] Date of Patent: Mar. 4, 1997

[54] ABRADING APPARATUS

[75] Inventors: John L. Barry, North St. Paul; Donald R. Bell, White Bear Township, Ramsey County, both of Minn.; Jason A. Chesley, Hudson, Wis.; Harold E. Rude, Roseville, Minn.; William F. Sheffield, Oakdale, Minn.; David F. Slama, Vadnais Heights, Minn.; Alan N. Stephens, Warwickshire, United Kingdom

[73] Assignee: Minnesota Mining and Manufacturing Company, St. Paul, Minn.

[21] Appl. No.: 181,195

[22] Filed: Jan. 13, 1994

[51] Int. Cl.⁶ .................................................. B24D 11/02
[52] U.S. Cl. ........................... 451/539; 451/538; 451/526
[58] Field of Search ................................. 451/426, 530, 451/538, 539, 526

[56] References Cited

U.S. PATENT DOCUMENTS

| | | | |
|---|---|---|---|
| 3,703,739 | 11/1972 | Young et al. | 451/538 |
| 4,064,018 | 12/1977 | Choi | 201/12 |
| 4,263,755 | 4/1981 | Globus | 451/538 |
| 4,644,703 | 2/1987 | Kaczmarek et al. | 51/401 |
| 4,932,163 | 6/1990 | Chilton et al. | 451/456 |
| 4,984,339 | 1/1991 | Provost et al. | 24/452 |
| 5,107,626 | 4/1992 | Mucci | 51/281 R |
| 5,174,795 | 12/1992 | Wiand | 51/295 |
| 5,201,149 | 4/1993 | Eisenblätter | 51/394 |
| 5,201,785 | 4/1993 | Nagano | 451/538 |
| 5,231,803 | 8/1993 | Lanzer | 51/325 |
| 5,254,194 | 10/1993 | Ott et al. | 156/176 |
| 5,281,244 | 1/1994 | Wiand | 451/530 |
| 5,309,681 | 5/1994 | Cheney et al. | 451/539 |
| 5,315,740 | 5/1994 | Provost | 24/452 |
| 5,339,499 | 8/1994 | Kennedy et al. | 24/452 |
| 5,374,262 | 12/1994 | Keuhn, Jr. et al. | 604/391 |
| 5,383,309 | 1/1995 | Sampietro | 451/539 |
| 5,445,558 | 8/1995 | Hutchins | 451/344 |

FOREIGN PATENT DOCUMENTS

| | | | |
|---|---|---|---|
| 0112405A1 | 7/1984 | European Pat. Off. | |
| 0341993A1 | 11/1989 | European Pat. Off. | A44B 18/00 |
| 0554668A1 | 8/1993 | European Pat. Off. | B24D 11/00 |
| 0575828A1 | 12/1993 | European Pat. Off. | A44B 18/00 |
| 3301210A1 | 7/1984 | Germany. | |
| 49-38734 | 4/1974 | Japan. | |
| 53-22501 | 3/1978 | Japan | C10B 49/22 |
| WO93/03889 | 3/1993 | WIPO | B24D 3/00 |
| WO93/20976 | 10/1993 | WIPO | B24D 3/00 |

OTHER PUBLICATIONS 3M brochure entitled "3M™ Hookit™ Finishing Film Discs . . . "; Document No. 60–4400–4654–2 (143) JR; 3M Automotive Trades Division, St. Paul, MN, 1993.

*Primary Examiner*—Willis Little
*Assistant Examiner*—Eileen P. Morgan
*Attorney, Agent, or Firm*—Gary L. Griswold; Walter N. Kirn; James J. Trussell

[57] ABSTRACT

A back-up pad is provided for supporting an abrasive article during abrading. The back-up pad includes a support portion, such as a polymeric backing, and an engaging portion, such as a loop material, for engaging hooking stems projecting from the abrasive article.

52 Claims, 2 Drawing Sheets

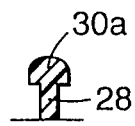 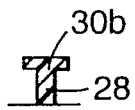 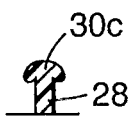 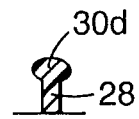
Fig. 4a    Fig. 4b    Fig. 4c    Fig. 4d
 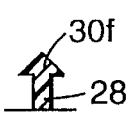  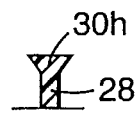
Fig. 4e    Fig. 4f    Fig. 4g    Fig. 4h
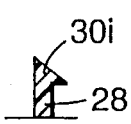  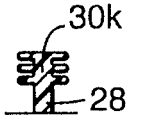 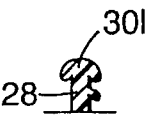
Fig. 4i    Fig. 4j    Fig. 4k    Fig. 4l
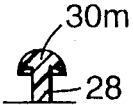 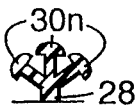
Fig. 4m    Fig. 4n
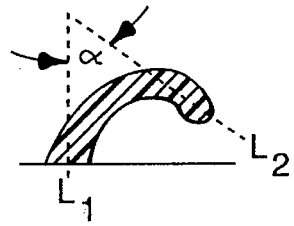
Fig. 5a
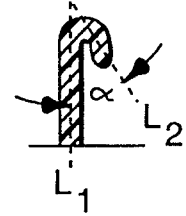
Fig. 5b
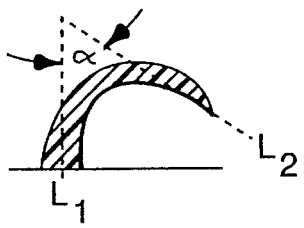
Fig. 5c
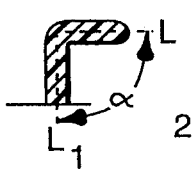
Fig. 5d
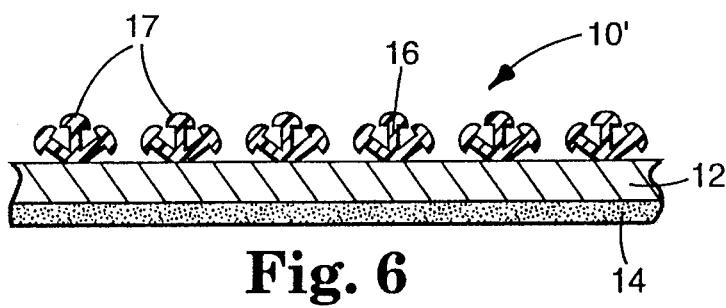
Fig. 6

ABRADING APPARATUS

TECHNICAL FIELD

The present invention relates to an abrading apparatus, and particularly to a back-up pad for supporting an abrasive article.

BACKGROUND OF THE INVENTION

Back-up pads are used in the abrasives field to provide support to an abrasive disc or sheet during abrading. The term "abrading" as used herein includes all methods of material removal due to frictional contact between contacting surfaces in relative motion, such as grinding, sanding, polishing, burnishing, and refining. The abrasive articles can be coated abrasives, lapping coated abrasives, or nonwoven abrasives. These abrasive articles can be in the form of a disc, sheet, or a polygon. The back-up pad includes a generally planar major surface, to which the abrasive article, such as a disc or sheet, may be attached. Although back-up pads may be hand held, back-up pads are more commonly used in conjunction with powered abrading apparatuses, such as electric or pneumatic sanders.

Abrasive discs and sheets (hereinafter "discs") may be attached to a back-up pad in one of many different ways. One popular attachment method includes an abrasive disc having pressure sensitive adhesive (PSA) on one surface thereof, such that the abrasive disc may be adhered to the major surface of the back-up pad. The major surface of the back-up pad may have, for example, a smooth foam, vinyl, or cloth surface to facilitate attachment of the abrasive disc. An example of such a back-up pad is available from the Minnesota Mining and Manufacturing Company of St. Paul, Minn. under the designation "STIK-IT" brand back-up pad. An example of an abrasive disc for attachment to that back-up pad is available from the same company under the designation "STIK-IT" brand abrasive disc.

Although they have certain benefits, PSA abrasive discs and back-up pads have some limitations. For example, the PSA can be too aggressive in its adhesion to the back-up pad, such that the operator may be unable to remove all of the abrasive article from the back-up pad. If pieces of the disc backing or areas of PSA, or both, are left on the back-up pad, the resultant buildup can cause high spots on the back-up pad and present an uneven and unbalanced operating surface for receipt of a new abrasive disc. Another potential deficiency of the PSA back-up pad is that when PSA from the abrasive article remains on the back-up pad, the PSA can become contaminated with dust and debris, resulting in a "dead" spot onto which a new disc will not adhere, or an uneven surface that can tend to leave wild scratches in the workpiece. Thus, back-up pads adapted for receipt of a pressure sensitive adhesive backed abrasive disc may be undesirable.

A second type of back-up pad includes a major surface having a plurality of hooks projecting therefrom. The hooks are adapted to engage certain structures provided on the back face of an abrasive disc to releasably attach the disc to the back-up pad. An example of such a back-up pad is available from the Minnesota Mining and Manufacturing Company of St. Paul, Minn. under the designation "HOOK-IT" brand back-up pad, and an example of an abrasive disc for attachment to that back-up pad is available from the same company under the designation "HOOK-IT" brand abrasive disc.

The hook-faced back-up pad has certain advantages, such as ease of attachment and reattachment to the abrasive disc, but it also demonstrates certain potential disadvantages. For example, repetitive engagement and disengagement of the loop-backed abrasive results in the loop fabric breaking and depositing debris between the hooks, which decreases the useful life of the back-up pad. Thus, the hook faced back-up pad may also be undesirable for some applications.

German patent DE 4 241 908, assigned to Dualflex Company, Ltd. of Ontario, Canada, discloses a back-up pad having a velvet-like material thereon. The material comprises individual fibers, some of which are connected to the back-up pad at only one end, and others which are connected to the back-up pad at both ends to form loops. This back-up pad is used with a tough, non-hardening adhesive to hold an abrasive article thereon. This backup pad can suffer from the same deficiencies as the backup pad used with a PSA disc, above, and may thus be undesirable.

It is therefore desirable to provide a back-up pad and abrasive article that overcome the disadvantages of the prior art.

SUMMARY OF THE INVENTION

The present invention provides an abrading apparatus comprising a back-up pad, including a support member having a major surface, and an engaging surface adjoining said major surface, the engaging surface comprising means for engaging projecting hooking stems, and an abrasive article, including a substrate having first and second major surfaces, the first major surface including means for abrading a work surface, and the second major surface including hooking stems for releasably engaging the loop members of the back-up pad.

Also provided is an abrading apparatus for use with an abrasive article having a plurality of hooking stems projecting from a surface thereof, comprising a back-up pad including a support portion having a major surface, and a plurality of hooking stems adjoining and projecting from the major surface, and a conversion pad releasably attached to the major surface, including first and second opposed pad surfaces, the first pad surface including an engaging surface for releasably engaging the hooking stems projecting from the major surface of the back-up pad, and the second pad surface including an engaging surface for releasably engaging hooking stems projecting from the abrasive article.

Variations of the foregoing are also disclosed.

BRIEF DESCRIPTION OF THE DRAWINGS

The present invention will be further explained with reference to the appended Figures, wherein like structure is referred to by like numerals throughout the several views, and wherein:

FIGS. 4(a) through 4(n) are sectional views of several embodiments of hooking stems for use with the abrading apparatus of the present invention;

FIGS. 5(a) through 5(d) are sectional views of several additional embodiments of hooking stems for use with the abrading apparatus of the present invention; and FIG. 6 is a sectional view of an abrasive article for use in conjunction with the present invention.

DETAILED DESCRIPTION OF THE INVENTION

The back-up pad of the present invention includes a major surface, also referred to as the front surface, which is adapted to releasably engage with hooking stems that project from an abrasive article, such as a disc or sheet. Abrasive articles having such hooking stems are disclosed in U.S. patent application Ser. Nos. 08/191,192, filed Jan. 13, 1994 and entitled "Abrasive Article," and 08/191,192 filed Jan. 13, 1994 and entitled "Method of Making an Abrasive Article," which are incorporated by reference herein. The abrasive article is supported by the back-up pad for use in abrading the surface of a workpiece.

Figure 1:
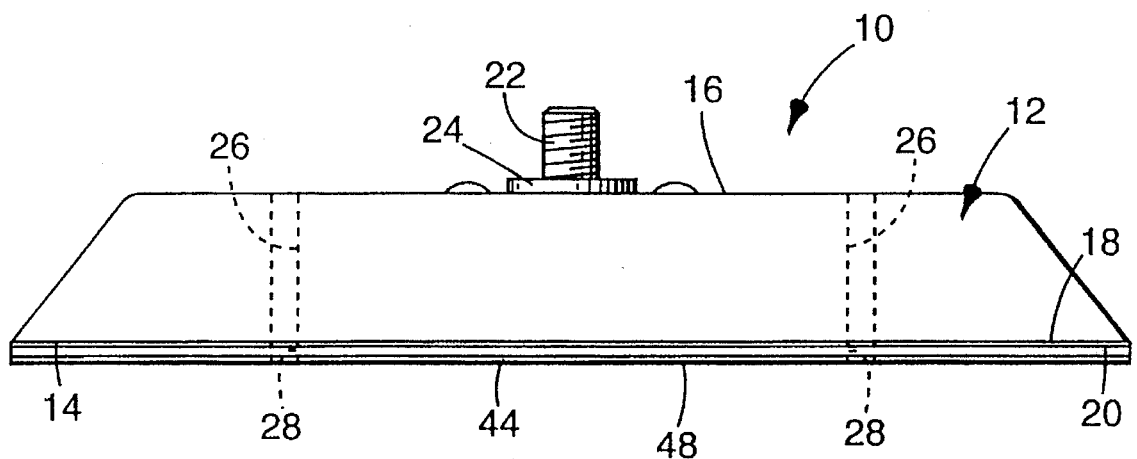
FIG. 1 is a side view of an abrading apparatus according to the present invention.

As shown in FIG. 1, the back-up pad 10 of the present invention generally includes a support member 12 and an engaging surface 20. Support member 12 includes a major surface 14, and preferably a minor surface 16. Major surface 14 is shown as planar, but could have any suitable topography. The back-up pad major surface may, for example, contain raised portions that increase the force applied to the work surface per area of the abrasive article, and can produce increased material removal rates. The shape of the back-up pad typically is the same as the shape of the abrasive article to be carried by the back-up pad, although this symmetry is not required. Some popular back-up pad shapes include a square, a triangle, a rectangle, an oval, a circle, a pentagon, a hexagon, an octagon, and the like.

The diameter for a circular back-up pad can range from about 1.25 to 125 cm (0.5 to 50 inches), typically about 2.5 to 75 cm (1 to 30 inches). The length and/or width of a non-circular back-up pad is usually on the same order, and can range from about 1.25 to 125 cm (0.5 to 50 inches), typically about 2.5 to 75 cm (1 to 30 inches). The back-up pad may also have a slightly smaller diameter than the abrasive article. For example, the abrasive article may overhang the back-up pad by a very slight amount—typically less than 0.25 cm (0.1 inch), and preferably less than 0.13 cm (0.05 inch). The thickness of the back-up pad support member is typically in the range of 0.6 to 12.5 cm (0.25 to 5.0 in), although larger and smaller thicknesses are contemplated. The thickness of the back-up pad may also vary at different locations of the back-up pad.

The support member may be designed for use with a desired abrading application. For example, for wood and some metal sanding, the support member of the back-up pad is typically made of a compressible, resilient material, such as open and closed cell polymeric foams (such as soft closed cell neoprene foam, open cell polyester foam, polyurethane foam, reticulated or non-reticulated slabstock foams), rubber, porous thermoplastic polymers, and the like. For some applications, it is desirable to construct the support portion from a more rigid material, to facilitate the transmission of abrading forces in a localized area, such as for heavy stock removal or relatively high pressure abrading. Examples of suitable rigid materials include steel (including stainless steel and mild steel), hard rubbers, vulcanized rubbers, thermosetting polymers such as crosslinked phenolic resins, ceramics, laminated or pressed fibers, and the like.

The support member may also include optional front facing 18, which protects the support member and anchors the engaging surface 20 to the back-up pad. The front facing may include such materials as cloth, nonwoven substrates, treated cloth, treated nonwoven substrates, polymeric films, and the like. Preferred front facing materials include nylon coated cloths, vinyl coated nonwovens, vinyl coated woven fabrics, and treated woven fabrics.

If the back-up pad is intended to be mounted on a machine for movement thereby, the back-up pad will typically have some type of mechanical attachment means on minor surface 14. For instance, for random orbital applications the support member may include a threaded shaft 22 adjoining the minor surface and projecting orthogonally therefrom. The threaded shaft may be engaged with the output shaft of the machine, and the back-up pad secured to the machine thereby. Other attachment means are also contemplated, including but not limited to an unthreaded shaft, a threaded nut, a threaded washer, adhesives, and magnets.

If the back-up pad is intended to be used by hand, the support member can include a handle that makes the apparatus easier to manipulate. The handle is typically provided in place of the attachment means described in the preceding paragraph, but could instead be secured to the attachment means. Other suitable handle configurations can be provided as desired.

A backing plate 24 may also be provided, and may overlie the minor surface as shown in FIG. 1 to provide added rigidity to the back-up pad. Alternately, the backing plate may be incorporated into the support portion to provide additional rigidity. In the embodiment illustrated in FIG. 1, the threaded shaft attachment means adjoins the backing plate, and other variations may also be used.

The back-up pad may also include one or more holes, apertures, or passageways through which dust, debris, or an abrading fluid (such as water or oil) may be removed from the abrading surface. Passageways 26, shown in FIG. 1, are typically connected to a vacuum source that removes any generated dust and debris from the abrading surface. The abrasive article typically includes holes 28 in a size and pattern matching the passageways in the back-up pad of the present invention. U.S. Pat. Nos. 4,184,291 and 4,287,685, the contents of which are incorporated herein by reference, further describe such dust removal passageways and holes. Passageways may also or instead be provided for the provision or removal of water or other lubricants or grinding aids.

Figure 2:
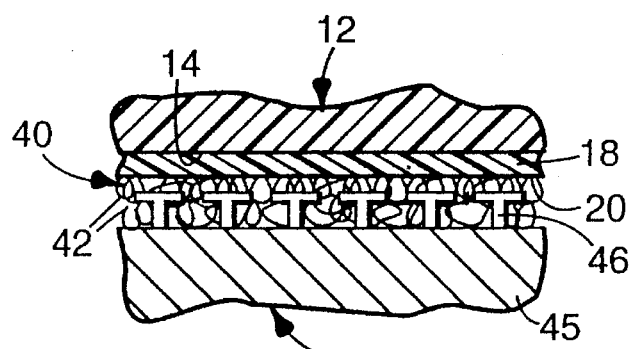
FIG. 2 is a sectional view of the interface between the back-up pad and the abrasive article of the present invention.

The back-up pad of the invention also includes an engaging surface 20 adjoining major surface 14. Engaging surface 20 facilitates the releasable attachment of abrasive article 44, which is described further hereinafter. Engaging surface 20 may directly adjoin or be integral with major surface 14, or may be bonded to front facing 18 or to other intermediate layers that are bonded to major surface 14, as shown in FIGS. 1 and 2. Although engaging surface 20 may take one of many different forms, each embodiment shares the common feature that the engaging surface is adapted for releasable engagement with a plurality of hooking stems. As used herein, a hooking stem means a stem having 1) a free end that is spaced from the surface to which the stem is attached, and 2) a structure that enables the hooking stem to releasably hook the features of the engaging surface. Two particular structures that enable a hooking stem to releasably hook the engaging surface, as described in U.S. patent application Ser. No. 08/191,192, entitled "Abrasive Article" and incorporated by reference above, are a head adjoining each stem, or a stem having an included distal end angle of less than approximately 90 degrees. It should be noted that not all of the hooking stems must engage with the engaging surface, but a sufficient number of hooking stems should be engaged to enable the abrasive article to be easily attached to and detached from the back-up pad, while preventing the abrasive article from shifting significantly relative to the back-up pad during use. The abrasive article will be described in greater detail hereinafter.

One embodiment of an engaging surface adapted for releasable engagement with a plurality of hooking stems is illustrated in FIG. 2. In that Figure, the engaging surface includes a loop fabric 40 secured thereto. Loop fabric 40 can be either knitted loop, warp knitted loop fabric, stitched loop fabric, or woven loop fabric, which fabric includes loops 42 that releasably engage the hooking stems 46 of the back side of the abrasive article 44 to attach the abrasive article to the back-up pad. The loop fabric material includes a plurality of loops 42 comprising filaments (either individual or grouped (such as a yarn)), anchored to the loop fabric material at each end. The hooking stems hook the loop opening to attach the abrasive article to the back-up pad.

The loop fabric preferably is durable, exhibits good holding power, does not fuzz, lint, or shed, and allows simple attachment and detachment of the abrasive article. Durability is an important parameter, because the back-up pad may be attached to and detached from hundreds or thousands of abrasive articles during its lifetime. Because the abrasive articles are disposable, meaning that they are usually discarded after one or a few uses, the durability of the back-up pad is more important than the durability of the abrasive article. Thus, it is preferred that the back-up pad, and particularly the engaging surface, be durable enough to withstand 100 or more engagements with an abrasive article.

The back-up pad, and particularly the engaging surface, should permit the abrasive article to be removed with a small amount of force, but should resist movement relative to the abrasive article during use. For example, a 90 degree peel force of less than approximately 0.36 kilograms per linear centimeter (about 2 pounds per linear inch), and preferably of approximately 50 grams per linear centimeter (0.3 pounds per linear inch) is suitable for some applications. A shear force (the force exerted on the disc in the plane of the major surface of the back-up pad) in the range of 710 to 1430 grams per linear centimeter (about 4 to 8 pounds per linear inch) is believed to be adequate to prevent the abrasive article from shifting relative to the back-up pad during use.

The height of the loops in this embodiment (i.e. the approximate average distance from the base of the loop fabric to the top of the loop) ranges from about 0.025 cm (0.010 inch) to 0.625 cm (0.25 inch), preferably 0.063 cm (0.025 inch) to 0.45 cm (0.175 inch), and more preferably between 0.125 cm (0.05 inch) to 0.325 cm (0.15 inch). If the loop height is too large, the abrasive article may shift during use, which decreases abrading performance and may be disadvantageous. If the loop height is too small, there may not be sufficient attachment of the hooking stems and the loop fabric. In general, the height of the loop fabric should be of the same order of magnitude as the height of the hooking stems. Additionally, the loop dimensions may depend upon the shape and type of hooking stems provided.

The loop density may also be selected to provide suitable performance characteristics. For example, the density of the loops can be the same as or different from the density of the hooks. The loop density usually ranges between 30 and 4000 loops per square centimeter (about 200 and 25,000 loops per square inch), preferably between 100 and 3000 loops per square centimeter (about 65 and 1900 loops per square inch), and more preferably between 50 and 150 loops per square centimeter (about 325 and 970 loops per square inch). If the loop density is too high, the cost of the loop fabric typically increases, and it may be difficult to remove the abrasive article from the back-up pad without damaging one or the other component. If the loop density is too low, the peel and shear strength may be insufficient, which could decrease performance due to the insufficient attachment force.

The loop fabric material includes a plurality of loops comprising filaments. The filaments may be either individual filaments, or more preferably yarns comprising a group of twisted filaments, and the yarn denier preferably ranges from about 15 to 600 denier, and more preferably between 100 and 300 denier. The denier is a unit of fineness, based on a standard of 50 milligrams per 450 meters of yarn. Because one or more filaments or yarns may break when the abrasive article is removed from the back-up pad, it is preferred that there be a sufficient number of filaments in a yarn to provide a long lasting back-up pad. There are preferably between 2 to 25, and more preferably between 7 to 15 filaments in a single yarn. The denier of each filament usually ranges from about between 2 to 100, and more preferably between 10 to 30 denier. It is also possible to have several combinations of yarn and filament deniers in the same loop fabric. It should be noted that in the case where the abrasive article includes hooking stems having heads, the filament or yarn diameter is preferably about one-half of the distance that the head overhangs the stem.

The material from which the filaments are made may be selected as desired, and could include such organic materials as thermoplastic and thermosetting materials like polyamides (such as nylon), polyolefins, polyurethanes, aramids, polyester, cellulosic materials, or such inorganic materials as metal (including aluminum or steel) or ceramic (including glass and fiberglass). The filament may also be a combination of different materials. The filament may be straight, curved, or twisted, and may contain a surface treatment of some type, such as an antistatic coating, or silicone.

The breaking strength, or tenacity, of an individual filament should be at least 10 grams (0.35 ounces) and preferably at least 60 grams (2.1 ounces). It is preferred that as the abrasive article is removed from the back-up pad, the filaments, or segments of, do not break or discharge from the loop fabric. These filament remnants create an undesirable "fuzz" which can contaminate the workpiece being abraded, or other contaminant sensitive surfaces (freshly painted surfaces, for example). Thus the loop material should be sufficiently strong to minimize the fuzzing effect. Also, the filament should be sufficiently strong to hold the hooking stem effectively and not release the hooking stem prematurely (during abrading, for example). The loop fabric may be made by known knitting processes, such as conventional knitting, warp knitting, and stitched loop.

Knitted loop fabrics (such as Guilford 19073, available from the Guilford Mills Company of Greensboro, N.C.) are preferred over woven loop fabrics for several reasons. The former are typically available in finished widths of greater than about 10 cm (4 in), and can be produced at higher production line speeds, and thus at lower unit cost. Loop fabric, because of the method of production used to make it, does not always have projecting loops presented for engagement, and thus a separate manufacturing step must be used to orient the loops. Knitted loop fabrics also tend to give a more uniform and lower loop height than a woven loop fabric. A lower and more uniform loop is desirable because it exhibits a reduced tendency for the attached abrasive article to shift. In addition, higher loop densities are typically attainable with knitted materials than with woven materials. The loops can be knitted in a uniform or homogeneous arrangement, or in a desired pattern, such as a sinusoidal or a random pattern.

The loop fabric is secured to the front face of the support member, typically by an adhesive. For example, a laminating adhesive can be used to secure the loop fabric to the support member. Examples of suitable laminating adhesives include polyolefins, polyesters, polyurethanes, polyamides, phenolic adhesives, urea-formaldehyde adhesives, epoxy adhesives, acrylate adhesives and the like. Alternatively, the loops can be directly bonded to the support member, such as in the case of thermoplastic loops that can be melt bonded to the support member. In another embodiment, the support member can be formed around and bonded to the loop fabric. For instance, a polyurethane material can be foamed directly to the back side of the loop fabric, thereby adhering to the loop fabric.

Figure 3:
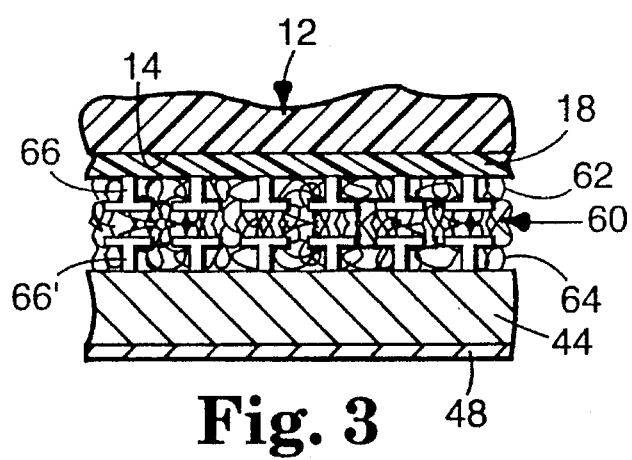
FIG. 3 is a sectional view of the back-up pad, the conversion pad, and the abrasive article of the present invention.

In another embodiment of the back-up pad of the present invention, the engaging surface is provided by a conversion pad 60, as shown in FIG. 3. Conversion pad 60 comprises two opposed faces 62 and 64 each comprising loop fabric, such that the conversion pad may be applied to a back-up pad having hooking stems 66, and may receive on the opposite surface an abrasive article having hooking stems 66'. Preferably, both faces of the conversion pad should include the loop material described above, although the surfaces may comprise different loop materials designed to best engage with the hooking stems of the back-up pad and the abrasive article. As noted previously, not all hooking stems must engage with the loop material to secure the abrasive article to the back-up pad.

The back-up pad of the present invention is preferably used with an abrasive article of the following general design. The abrasive article, although illustrated herein as being circular and flat, could have any desired shape, including but not limited to a circle, an oval, a polygon (such as a rectangle, square, or a star), or a multi-lobed shape (such as a daisy). The abrasive article 44 includes a substrate having hooking stems 46, and an abrasive surface 48, each of which will be described in greater detail below.

The substrate 45 may comprise one or more of several different materials, including but not limited to fabric or cloth, paper, polymeric film, vulcanized fiber, woven or nonwoven webs, and treated versions or combinations thereof. A preferred substrate is a primed polyester film, which is available from Imperial Chemical Industries Americas Inc. of Wilmington, Del. under the designation ICI-475 film.

One major surface of substrate 45 includes means for abrading a surface. In the illustrated embodiment, abrasive means is shown as abrasive surface 48 comprising particles that are bonded to the substrate by a bonding material. The abrasive particles can include, but are not limited to, garnet, cubic boron nitride, emery, aluminum oxide, silicon carbide, alumina-zirconia, diamond, and ceramic aluminum oxide. Typical bonding materials include animal glue and synthetic resins. Materials such as grinding aids, fillers, dyes, pigments, fibers, lubricants, surfactants, antistatic agents, coupling agents, plasticizers, and suspending agents may also be added to the abrasive means.

Nonwoven abrasive products incorporating abrasive grains may also be used as abrasive means in conjunction with the present invention. Nonwovens typically comprise an open porous lofty polymer filament structure (substrate) having the abrasive grains distributed throughout the fiber structure and bonded therein by an organic binder. Typical fibrous filaments structures applicable to such constructions comprise polyamides, polyesters, and polypropylene. Nonwoven abrasives are well known in the art—see, for example, U.S. Pat. No. 2,958,593 (Hoover et al.)— and thus will not be described further herein.

Hooking stems 46 are provided on the opposite major surface of the substrate 45. As used herein, a hooking stem means a stem having 1) a free end that is spaced from the surface to which the stem is attached, and 2) a structure that enables the hooking stem to releasably hook structures provided on an opposed surface. Hooking stems 46 may be selected from among numerous different designs, such as those illustrated in FIGS. 4(a) through 4(n) and FIGS. 5(a) through 5(d). It should be understood that other hooking stem designs are comprehended by the present invention, though they are not specifically described herein.

Each hooking stem is provided on and projects from the substrate 45. The hooking stems may be directly provided on the substrate by being formed integrally with the substrate, or may be provided on an intermediate sheet or layer, which is affixed to the substrate. Stated differently, the individual hooking stems may or may not be directly bonded to the substrate 45. The hooking stems of the present invention may be provided on the second major surface in one of several ways. For example, the hooking stems may be formed from the same material as the substrate, such that the hooking stems are unitary with the substrate. Alternatively, the hooking stems may be affixed to the second major surface by, for example, an adhesive such as a hot-melt adhesive. In another embodiment, the hooking stems are formed from a separate sheet member (e.g. a plastic sheet), and the sheet member is affixed to the substrate. The separate sheet member may be bonded to the substrate directly (by ultrasonic bonding, for example), or by means of an adhesive. Other layers, including but not limited to an adhesive layer or a primer layer, may also be interposed between the hooking stems and the substrate.

Each hooking stem comprises a stem 28 and hooking means, as described herein. Stem 28 may have any suitable cross-sectional shape, taken parallel to the substrate, including but not limited to a circle, an oval, a polygon (such as a star, a cross, a rectangle, or a parallelogram), or a multi-lobed shape (such as a daisy or a clover). The stems may be solid or hollow, as desired, and the cross-sectional area of the stem taken parallel to the substrate, in the case of a cylindrical stem, is preferably within the range of about 0.002 to 25 mm$^2$ (0.000004 to 0.04 in$^2$), more preferably between 0.01 and 1.0 mm$^2$ (0.000016 and 0.0016 in$^2$), and most preferably between 0.05 and 0.45 mm$^2$ (0.000078 and 0.0007 in$^2$). The maximum diameter of the cylindrical stem is preferably between approximately 0.05 and 5.0 mm (0.002 and 0.20 in), more preferably between 0.13 and 1.0 mm (0.005 and 0.04 in), and most preferably between 0.25 and 0.76 mm (0.01 and 0.03 in). The overall length of the stem is preferably between approximately 0.01 and 10 mm (0.0004 and 0.40 in), more preferably between 0.05 and 2.6 mm (0.002 and 0.102 in), and most preferably between 0.13 and 1.0 mm (0.005 and 0.04 in). It should be noted that hooking stem shapes, diameters, and lengths can be mixed within a given abrasive article, such that the abrasive article comprises hooking stems of more than one shape, diameter, and/or length. Also, the shape, size, and orientation of the hooking stems may be selected to provide a suitable shear strength and peel strength for a given application.

Hooking stems 46 may be straight or arcuate, and may be arranged in a regular array or be randomly distributed across the second major surface. For example, it may be desirable to provide helical hooking stems, or to arrange the hooking stems in parallel, sinusoidal columns. The hooking stem density can be selected as desired, and preferably is between approximately 8 and 310 hooking stems per square centimeter (50 and 2000 hooking stems per square inch), although other hooking stem densities can be provided.

When the abrasive article is attached to an opposed surface, such as a surface having a plurality of loop members, not all of the hooking stems must engage with the structures (such as a loop) of the opposed surface. Typically, a majority of the hooking stems will hook the structures of the engaging surface, and the disengagement force will typically be directly related to the number of hooking stems that are engaged. The percentage of hooking stems that are engaged by a particular opposed surface depends on many factors, such as hooking stem dimensions and density, and the topography of the opposed surface.

The hooking stems 46 may also be arranged in a plurality of clusters, as shown in FIG. 6 at 17. That is, two or more stems may be placed close to each other in a cluster, with adjacent clusters separated from each other by a distance greater than the distance between the stems within a cluster. The stems within each cluster could be inclined at any suitable orientation, although the stems within each cluster are preferably inclined at different orientations. Furthermore, the clusters could be randomly or uniformly distributed over the surface to which the stems are attached, as suitable to the particular application. Clusters can be provided in a plurality of rows, or stripes, and those rows may be parallel (either straight rows, or curvalinear rows).

The preferred hooking stem material is an organic polymeric material, such as a thermosetting material or a thermoplastic material. Useful materials include, but are not limited to, polyurethanes, polyamides, polyolefins (for example, polyethylene and polypropylene), polyesters, and combinations thereof. The hooking stem may also comprise one or more additives, including but not limited to fillers, fibers, antistatic agents, lubricants, wetting agents, surfactants, pigments, dyes, coupling agents, plasticizers, and suspending agents.

The hooking stems discussed above also include means for hooking an engaging structure on an opposed surface (such as a loop material) to releasably affix the abrasive article to the opposed surface. In one embodiment, the hooking means is shown as at least one head 30 (shown as heads 30a through 30n in the illustrated embodiments) provided on each stem, as shown in the side views illustrated in FIGS. 4(a) through 4(n). Head 30 may also, or instead, be provided at other locations along the stem, as shown in FIG. 4(l), for example. A head, as used herein, means any structure that extends radially beyond the periphery of the stem in at least one direction.

Head 30 may have any suitable three-dimensional shape, such as, for example, a hemisphere, a sphere, a cube, a mushroom cap, a cylinder, a cone, a pyramid, a disc, or a barb. Some head designs thought to have utility in the context of the present invention are shown in FIG. 4. It is preferred, although not required, that the head have at least one undercut portion that extends away from the stem at approximately a 90 degree angle, such as the heads shown in FIGS. 4(a), 4.(b), 4(e), 4(f), 4(g), 4(i), 4(j), and 4(k) to hook the engaging members of an opposed mating surface. It is also possible to provide a head having portions that extend toward the base of the stem 28, creating an "underhang" portion of the head. In other embodiments, each stem is provided with two or more heads, the shape of which may be selected as desired.

The length of head 30 is preferably between approximately 0.05 mm and 2.0 mm (0.002 and 0.079 in), and is more preferably between approximately 0.1 and 1.1 mm (0.004 and 0.045 in), measured from the first point at which the head portion departs from the stem to the point most distant therefrom. These size ranges are for hooking stems that are adapted for interengagement with a durable loop material.

The size of the portion of the head that extends radially beyond the stem can be important for insuring proper engagement and disengagement of the abrasive article and the opposed surface. If the head extends radially beyond the stem for too little a distance, the disengagement force between the abrasive article and the opposed surface may be insufficient. Conversely, if the head extends beyond the stem for too great a distance, the heads may not engage with the opposed surface, or if a sufficient number of heads engage, the disengagement force may be greater than is desired. Thus, it is preferred that the maximum head diameter exceed the stem diameter by at least approximately 0.05 mm (0.002 in), but not by more than approximately 1.5 mm (0.06 in).

The hooking stems are preferably generally perpendicular to the second surface, although the hooking stems may be inclined with respect to the second surface if desired. Also, it may be desirable to provide heads at either a predetermined orientation or at a random orientation relative to each adjacent head, to increase the disengagement force associated with the disc. In addition, for an abrasive article such as a disc to remain firmly attached to a mating surface while in use, it is preferred that if the heads on the hooking stems are provided on only one side of the stem (known as a "directional" hooking stem), then the heads on the hooking stems should not all have the same orientation.

In another embodiment, the hooking means of the present invention comprises hooking stems having an included distal end angle of less than approximately 90 degrees, as shown in FIGS. 5(a) through 5(d). The included distal end angle, which is illustrated by the symbol $\alpha$ in FIG. 5, is defined as the included angle between a straight line perpendicular to the second major surface at the proximal end of the hooking stem (line $L_1$ in FIG. 5) and a straight line extending through and concentric with the distal end of the hooking stem (line $L_2$ in FIG. 5). When angle $\alpha$ is less than approximately 90 degrees, the distal end of each hooking stem is adapted to hook an engaging structure of an opposed surface, and yet may be released from that structure by an appropriate tensile force. Hooking stems constructed in accordance with this embodiment may also include a head of the type described with reference to FIG. 4, above, but a head is not required due to the specified distal end angle of the hooking stems.

The abrading apparatus of the present invention may be made in one of many different ways, only some of which are specifically described and illustrated herein. With regard to suitable methods of making the abrasive article of the present invention, reference is made to commonly assigned copending U.S. patent application Ser. No. 08/191,193, entitled "Method of Making an Abrasive Article" filed Jan. 13, 1994, the contents of which is incorporated herein by reference. Several suitable processes are adaptations of known methods for making fastener members, such as the methods described in U.S. Pat. Nos. 5,058,247 (for low cost hook fasteners) and 4,894,060 (for diaper fasteners), and in U.S. patent application Ser. No. 08/048,874, entitled "Mushroom-Type Hook Strip for a Mechanical Fastener," filed Apr. 18, 1992, which is commonly assigned to the assignee of the present invention.

The back-up pad of the present invention is described in greater detail below with respect to the following Examples and the testing procedure used therein.

Examples

Back-up Pad Testing Procedure

An accelerated life test was used to screen various samples of loop fabric for use on the face of the back-up pad. This test subjected experimentally prepared back-up pads (with a loop fabric on the attachment face) to a simulated grinding condition designed to provide an accelerated life test for the abrasive article attachment system between the back-up pad and the abrasive article. The test proceeded until the loop fabric on the back-up pad was unable to hold the abrasive article in place during the abrading process.

In each of the Examples, the loop fabric was attached to a back-up pad available from the Minnesota Mining and Manufacturing Company of St. Paul, Minn., under the designation "STIK-IT" part number 5527, using a polyacrylate pressure sensitive adhesive. This method provided a back-up pad having a polyurethane support portion that was directly bonded to the loop fabric.

The test procedure was as follows:

Step 1) A dual action air sander of the type available from National Detroit Inc., of Rockford, Ill., under the designation DAQ, was attached to a programmable robotic arm. The back-up pad was then attached to the DAQ air sander.

Step 2) An abrasive disc with hooking stems was attached to the loop fabric face of the back-up pad using two firm pats of the operator's hand. All tests were made using the same type of abrasive article, which included an abrasive disc having a hooking stem backing layer laminated thereto.

The abrasive disc was of the type available from the Minnesota Mining and Manufacturing Company of St. Paul, Minn., under the designation 3M 255L Grade 80 "STIK-IT" brand Gold Film abrasive disc. The abrasive disc included a layer of polyacrylate pressure sensitive adhesive on the rear face thereof, to which a backing layer having a plurality of hooking stems was adhered. The hooking stems had a mushroom cap head design, a density of 47 hooking stems per square centimeter (300 per square inch), a stem diameter of 0.43 mm (0.017 inch), were 0.53 mm (0.021 inch) tall, and the head overhung the stem by 0.033 to 0.41 mm (0.013 to 0.016 inch).

Step 3) The abrasive disc was rotated by activating the pneumatic DAQ air sander, with a dynamic air pressure at the tool (the air pressure with the back-up pad allowed to rotate freely) of approximately 42 newtons per square centimeter (60 pounds per square inch). The robotic arm was directed to contact the abrasive face of the rotating abrasive disc onto a flat, 14 gauge steel panel at approximately 30 degree angle between the panel and the plane of the abrasive disc, using about 110 newtons (25 pounds) of downward force. The sanding action was side-to-side for 30 seconds and toward and away from the robotic arm for 30 seconds, at approximately 1 second per sweep. The total sanding time was thus one minute.

Step 4) The abrasive disc was removed from the back-up pad, and reattached to the back-up pad using two firm pats by the operator's hand. The abrasive disc was replaced with a new abrasive disc after every third sanding cycle.

Step 5) Repeated Step 3) and Step 4) until the attachment system between the loop fabric and the hooking stem failed. Failure is defined as the abrasive disc either having less than 50% of the disc contacting the back-up pad, or the disc becoming completely detached during the test.

Each of the following exemplary back-up pads was subjected to the foregoing accelerated life test. The different Examples are described below, and the relative life (as denoted by cycles to failure) is shown in Table One.

Comparative Example A

For Comparative Example A, the loop material adhered to the back-up pad was made in accordance with the disclosure of U.S. Pat. No. 4,609,581 (Ott). The material consists of polyester yarn of 150 denier, with 34 filaments per yarn, stitched into a pattern of about 30 loops per square centimeter. The strength, or tenacity of each filament was approximately 30 grams (1.05 ounces). The basis weight of the material was approximately 77.36 grams per square meter (2.31 ounces per square yard).

Comparative Example B

For Comparative Example B, the loop material adhered to the back-up pad was a napped nylon fiber material available from Guilford Mills, of Greensboro, N.C., under the designation 18904. The material consists of nylon yarn of 40 denier, with 12 filaments per yarn, stitched into a pattern of about 2900 loops per square centimeter. The strength, or tenacity of each filament was approximately 12 grams (0.42 ounces). The basis weight of the material was approximately 97.5 grams per square meter (2.92 ounces per square yard).

Comparative Example C

For Comparative Example C, the loop material adhered to the back-up pad was a knitted nylon fiber material available from APLIX Inc., of Charlotte, N.C., under the designation APLIX 200. The material consists of nylon yarn stitched into a pattern. The strength, or tenacity of each filament was approximately 25 grams (0.875 ounces). The basis weight of the material was approximately 334 grams per square meter (10 ounces per square yard).

Comparative Example D

For Comparative Example D, the loop material adhered to the back-up pad was a knitted nylon fiber material available from Velcro USA Inc., of Manchester, N.H., under the designation 3610. The material consists of nylon yarn of 140 denier, stitched into a pattern. The strength, or tenacity of each filament was approximately 20 grams (0.7 ounces). The basis weight of the material was approximately 300 grams per square meter (9 ounces per square yard).

Example One

For Example One, the loop material adhered to the back-up pad was a knitted nylon 6 fiber material available from Guilford Mills, of Greensboro, N.C., under the designation 19073. The material consists of nylon yarn of 200 denier, with 10 filaments per yarn, stitched into a pattern of about 900 loops per square centimeter. The strength, or tenacity of each filament was approximately 80 grams (2.8 ounces). The basis weight of the material was approximately 334.9 grams per square meter (9.9 ounces per square yard).

Example Two

For Example Two, the loop material adhered to the back-up pad was a knitted nylon fiber material available from Kanebo Belltouch Ltd., of Osaka, Japan, under the designation 2A3. The material consists of nylon yarn of 210 denier, with 12 filaments per yarn, stitched into a pattern of about 1765 loops per square centimeter. The strength, or tenacity of each filament was approximately 75 grams (2.625 ounces). The basis weight of the material was approximately 461.2 grams per square meter (13.7 ounces per square yard).

TABLE ONE

| Loop Fabric | Cycles to Failure |
| --- | --- |
| Comparative Example A | 12–15 |
| Comparative Example B | <1 |
| Comparative Example C | 40 |
| Comparative Example D | 40 |
| Example One | 666 |
| Example Two | >700 |

Thus, the back-up pad of the present invention, as illustrated in Examples One and Two, appears to demonstrate superior durability in the reattachment tests described above.

The back-up pad of the invention can be used in any desired abrading application, such as polishing of ophthalmic lenses, wood and plastic sanding, and heavy stock removal of metal parts. The abrading motion can be a linear motion, random motion, rotary motion, oscillation, random orbital motion, or combinations thereof, and may use tools and machinery known in the abrading field.

The present invention has now been described with reference to several embodiments thereof. It will be apparent to those skilled in the art that many changes can be made in the embodiments described without departing from the scope of the invention. Thus, the scope of the present invention should not be limited to the structures described herein, but rather by the structures described by the language of the claims, and the equivalents of those structures.

We claim:

1. An abrading apparatus, comprising:
   (a) a back-up pad, including a support member including a major surface, and an engaging surface adjoining said major surface, said engaging surface comprising a loop material having projecting loops, wherein each said loops has a breaking strength of at least 60 grams; and
   (b) an abrasive article, including a substrate having first and second major surfaces, said first major surface including means for abrading a work surface, and said second major surface including hooking stems for releasably engaged with said projecting loops of said back-up pad.

2. The abrading apparatus of claim 1, wherein said loop material comprises a loop fabric including a plurality of filaments each having first and second ends, said ends anchored or said engaging surface to provide said loop through which said hooking stem may releasably hook said loop.

3. The abrading apparatus of claim 2, wherein said loops have a height of between 0.05 and 2.6 millimeters.

4. The abrading apparatus of claim 1, wherein said support portion includes attachment means for attaching said back-up pad to a tool.

5. The abrading apparatus of claim 1, wherein said back-up pad is circular.

6. The abrading apparatus of claim 1, wherein said support portion is made from a material selected from the group consisting of open cell polymeric foam, closed cell polymeric foam, rubber, thermoplastic polymers, and thermosetting polymers.

7. The abrading apparatus of claim 1, wherein said back-up pad comprises at least one dust removal passageway formed therein, and said abrasive article includes at least one dust removal hole formed therein in registration with said at least one passageway formed in said back-up pad.

8. The abrading apparatus of claim 2, wherein the shape of said major surface is selected from the group consisting of a circle and a rectangle.

9. The abrading apparatus of claim 1, wherein each of said projecting loops comprises a single yarn having a plurality of filaments.

10. The abrading apparatus of claim 9, wherein each yarn comprises between 2 and 25 filaments.

11. The abrading apparatus of claim 9, wherein each yarn has a denier of between 15 and 600 denier.

12. The abrading apparatus of claim 9, wherein each filament has a breaking strength of at least 60 grams.

13. The abrading apparatus of claim 1, wherein said engaging surface comprises between 30 and 4000 loops per square centimeter.

14. The abrading apparatus of claim 1, wherein said hooking stems comprise at least one of a head adjoining each stem, and a stem having an included distal end angle of less than approximately 90 degrees.

15. The abrading apparatus of claim 1, wherein said hooking stems are provided directly on said substrate by being formed integrally with said second major surface.

16. The abrading apparatus of claim 1, wherein said hooking stems are provided on an intermediate sheet that is affixed to said second major surface.

17. The abrading apparatus of claim 1, wherein the cross-sectional shape of each hooking stem taken parallel to the second major surface is selected from said second group consisting of a circle, an oval, a polygon, and a multi-lobed shape.

18. The abrading apparatus of claim 1, wherein said hooking stems are solid.

19. The abrading apparatus of claim 1, wherein the cross-sectional area of said stem taken parallel to said substrate is between 0.002 to 25 square millimeters.

20. The abrading apparatus of claim 1, wherein said hooking stems are regularly arranged on said second major surface of said abrasive article.

21. The abrading apparatus of claim 1, wherein said hooking stems are provided in a plurality of clusters on said second major surface of said abrasive article.

22. The abrading apparatus of claim 1, wherein said abrasive article comprises between approximately 8 and 310 hooking stems per square centimeter on said second major surface.

23. The abrading apparatus of claim 1, wherein each of said loops comprises a single multifilament yarn comprising a plurality of filaments, and wherein each filament has a breaking strength of at least 60 grams.

24. The abrading apparatus of claim 1, wherein each of said loops comprises a single multifilament yarn of between 15 and 600 denier and comprising a plurality of filaments, and wherein each filament has a breaking strength of at least 60 grams.

25. The abrading apparatus of claim 1, wherein each of said loops comprises a single multifilament yarn comprising between 2 and 25 filaments, and wherein each filament has a breaking strength of at least 60 grams.

26. The abrading apparatus of claim 1, wherein each of said loops comprises a single multifilament yarn of between 15 and 600 denier and comprising between 2 and 25 filaments, and wherein each filament has a breaking strength of at least 60 grams.

27. The abrading apparatus of claim 1, wherein each of said hooking stems comprise a head, said head having a periphery extending radially beyond the periphery of said stem thereby defining a head overhang measured radially from the stem periphery to the outermost portion of the head periphery, and wherein said loops comprise a yarn having a diameter approximately one-half of the head overhang.

28. The abrading apparatus of claim 1, wherein each of said hooking stems comprise a head, said head having a periphery extending radially beyond the periphery of said stem thereby defining a head overhang measured radially from the stem periphery to the outermost portion of the head periphery, and wherein said loops comprise a multifilament yarn having a diameter approximately one-half of the head overhang.

29. The abrading apparatus of claim 1, wherein each of said hooking stems comprise a head, said head having a periphery extending radially beyond the periphery of said stem thereby defining a head overhang measured radially from the stem periphery to the outermost portion of the head periphery, and wherein said loops comprise a multifilament yarn, wherein each filament has a diameter approximately one-half of the head overhang.

30. An abrading apparatus for use with an abrasive article having a plurality of hooking stems projecting from a surface thereof, comprising:

(a) a back-up pad including a support portion having a major surface, and a plurality of hooking stems adjoining and projecting from said major surface; and (b) a conversion pad releasably attached to said major surface, including first and second opposed pad surfaces, said first pad surface including a first engaging surface for releasably engaging the hooking stems projecting from said major surface of said back-up pad, and said second pad surface including a second engaging surface for releasably engaging hooking stems projecting from an abrasive article. wherein at least one of said first and second engaging surfaces comprises a loop material having projecting loops, wherein each of said loops has a breaking strength of at least 60 grams.

31. The abrading apparatus of claim 30, wherein said apparatus further includes an abrasive article releasably attached to said conversion pad, said abrasive article including hooking stems projecting therefrom to releasably hook said engaging surface of said conversion pad.

32. The abrading apparatus of claim 31, wherein said hooking stems of said abrasive article and said hooking stems of said back-up pad comprise at least one of a head adjoining each stem, and a stem having an included distal end angle of less than approximately 90 degrees.

33. The abrading apparatus of claim 32, wherein said hooking stems of said back-up pad are formed integrally with said second major surface.

34. The abrading apparatus of claim 30, wherein said conversion pad comprises nonwoven fibers.

35. The abrading apparatus of claim 30, wherein said back-up pad comprises at least one dust removal passageway formed therein.

36. The abrading apparatus of claim 30, wherein said support portion includes attachment means for attaching said back-up pad to a tool.

37. The abrading apparatus of claim 30, wherein said back-up pad is circular.

38. The abrading apparatus of claim 30, wherein said support portion is made from a material selected from the group consisting of open cell polymeric foam, closed cell polymeric foam, rubber, thermoplastic polymers, and thermosetting polymers.

39. The abrading apparatus of claim 30, wherein said conversion pad comprises yarns each consisting of a plurality of filaments, said yarns providing said loops releasably engaged with said hooking stems of said back-up pad and adapted to releasably engage the hooking stems of an abrasive article.

40. The abrading apparatus of claim 39, wherein each of said loops comprises a single multifilament yarn comprising a plurality of filaments, and wherein each filament has a breaking strength of at least 60 grams.

41. The abrading apparatus of claim 39, wherein each of said loops comprises a single multifilament yarn of between 15 and 600 denier and comprising a plurality of filaments, and wherein each filament has a breaking strength of at least 60 grams.

42. The abrading apparatus of claim 39, wherein each of said loops comprises a single multifilament yarn comprising between 2 and 25 filaments, and wherein each filament has a breaking strength of at least 60 grams.

43. The abrading apparatus of claim 39, wherein each of said loops comprises a single multifilament yarn of between 15 and 600 denier and comprising between 2 and 25 filaments, and wherein each filament has a breaking strength of at least 60 grams.

44. The abrading apparatus of claim 39, wherein each of said hooking stems comprise a head, said head having a periphery extending radially beyond the periphery of said stem thereby defining a head overhang measured radially from the stem periphery to the outermost portion of the head periphery, and wherein said loops comprise a yarn having a diameter approximately one-half of the head overhang.

45. The abrading apparatus of claim 39, wherein each of said hooking stems comprise a head, said head having a periphery extending radially beyond the periphery of said stem thereby defining a head overhang measured radially from the stem periphery to the outermost portion of the head periphery, and wherein said loops comprise a multifilament yarn having a diameter approximately one-half of the head overhang.

46. The abrading apparatus of claim 39, wherein each of said hooking stems comprise a head, said head having a periphery extending radially beyond the periphery of said stem thereby defining a head overhang measured radially from the stem periphery to the outermost portion of the head periphery, and wherein said loops comprise a multifilament yarn, wherein each filament has a diameter approximately one-half of the head overhang.

47. The abrading apparatus of claim 30, wherein the cross-sectional shape of each hooking stem taken parallel to said second major surface is selected from the group consisting of a circle, an oval, a polygon, and a multi-lobed shape.

48. The abrading apparatus of claim 30, wherein said hooking stems of said back-up pad are solid.

49. The abrading apparatus of claim 30, wherein said hooking stems are regularly arranged on said back-up pad.

50. The abrading apparatus of claim 30, wherein said hooking stems are provided in a plurality of clusters on said back-up pad.

51. The abrading apparatus of claim 30, wherein said back-up pad comprises between approximately 8 and 310 hooking stems per square centimeter.

52. A back-up pad for use with an abrasive article releasably attached to said back-up pad, said back-up pad comprising a support member having a planar major surface for supporting an abrasive article thereon, and an engaging surface adjoining said major surface, said engaging surface comprising a loop fabric having loops projecting therefrom, said loops having a height of less than approximately 0.223 centimeters and a fiber breaking strength of at least 60 grams.

* * * * *

UNITED STATES PATENT AND TRADEMARK OFFICE
CERTIFICATE OF CORRECTION

PATENT NO. : 5,607,345
DATED : March 4, 1997
INVENTOR(S) : John L. Barry et al.

It is certified that error appears in the above-identified patent and that said Letters Patent is hereby corrected as shown below:

Column 3,
Line 15, "08/191,192" should read -- 08/191,193 --.

Column 13,
Line 49, between "each" and "said" insert -- of --.
Line 54, after "stems" delete "for".
Line 60, after "anchored" delete "or" and replace with -- to --.

Column 14,
Line 14, "2" should read -- 1 --.
Line 41, "the" should read -- said --.

Column 15,
Line 46, delete the period after "article".

Signed and Sealed this

Twentieth Day of November, 2001

Attest:

NICHOLAS P. GODICI
*Attesting Officer*　　　*Acting Director of the United States Patent and Trademark Office*